United States Patent [19]

Birchall et al.

[11] 3,870,737

[45] Mar. 11, 1975

[54] PHOSPHATES

[75] Inventors: James Derek Birchall; John Edward Cassidy, both of Runcorn, England

[73] Assignee: Imperial Chemical Industries, Limited, London, England

[22] Filed: July 25, 1972

[21] Appl. No.: 274,964

Related U.S. Application Data

[63] Continuation of Ser. No. 42,499, June 1, 1970.

[30] Foreign Application Priority Data

June 12, 1969 Great Britain.................... 29862/69

[52] U.S. Cl........ 260/448 R, 117/100 B, 117/100 S, 252/73, 252/74, 260/39, 264/109, 264/165, 423/300
[51] Int. Cl. .............................................. C07f 5/06
[58] Field of Search ................................ 260/448 R

[56] References Cited
UNITED STATES PATENTS
2,885,417   5/1959   Heyden...................... 260/448 R X

*Primary Examiner*—H. Sneed
*Attorney, Agent, or Firm*—Cushman, Darby & Cushman

[57] ABSTRACT

Complex phosphates of aluminum containing a halogen and chemically-bound molecule of a hydroxy compound, which may be water or an organic hydroxy compound. A typical example is a complex phosphate containing ethyl alcohol having the empirical formula $AlPClH_{25}C_8O_8$. They are most conveniently prepared by the reaction of an aluminum halide with the appropriate hydroxy compound and orthophosphoric acid, under relatively cool conditions. The compounds are generally soluble in water and polar organic solvents. They decompose at low temperatures to give aluminum orthophosphate, thereby providing a method for producing aluminum phosphate in many forms, for example, fibers, coatings, binders and fine particles, from a solution in water or organic solvents.

15 Claims, No Drawings

PHOSPHATES

This is a continuation, of application Ser. No. 42,499, filed June 1, 1970.

This invention relates to novel phosphates and to their preparation, and in particular to complex phosphates of aluminium. We have found that certain complex phosphates of aluminium are especially useful for preparing fibres, coatings, binders and fine particles of aluminium phosphate.

According to the present invention there is provided halogen-containing complex phosphates of aluminium containing at least one chemically-bound molecule of a hydroxy compound R-OH wherein R is a hydrogen atom or an organic group.

The term "phosphate" includes acid phosphates.

Where R is an organic group, it is preferred that it be an aliphatic hydrocarbon group or a substituted aliphatic hydrocarbon group, for example wherein the substituent is one or more of the following: amino, phenyl, hydroxyl, carboxyl or alkoxy. Unsubstituted aliphatic alcohols are especially preferred as the hydroxy compound since complex phosphates according to the invention containing them are easily separated solids obtainable in high yield. We have found that aliphatic alcohols containing one to ten carbon atoms are especially suitable, and owing to their ready availability we prefer to use aliphatic alcohols containing from one to four carbon atoms, for example, methanol, ethyl alcohol, n-propyl alcohol or isopropyl alcohol. In preferred embodiments of the invention, ethyl alcohol is used, as the complex phosphates containing it are especially readily formed as solids in high yield.

The halogen in the halogen-containing complex phosphate of aluminium is preferably chlorine, but the compounds may contain other halogens, for example bromine or iodine.

The ratio of the number of gram atoms of aluminium to the number of gram atoms of phosphorus in the complex phosphates of aluminium may vary over a wide range, for example from 1:2 to 2:1, but is preferably substantially 1:1 as complex phosphates of the invention having this ratio decompose at low temperatures directly to form aluminium orthophosphate having greater chemical stability and refractoriness than aluminium phosphate formed from complex phosphates with other ratios. The ratio of the number of gram atoms of aluminium to the number of gram atoms of halogen in the complex phosphates is preferably substantially 1:1.

The complex phosphates of the invention may be monomeric or polymeric.

The structure of the complex phosphates is not fully understood and some of the chemically-bound hydroxy compounds may be bound as groups - OR rather than as complete molecules.

The monomeric forms, or the repeating units of the polymeric forms of the complex phosphates, may contain, for example, from one to five molecules of the hydroxy compound. Most frequently the number of molecules of the hydroxy compound is 4. In some cases the complex phosphates may contain molecules of different hydroxy compounds, for example they may contain both chemically-bound water and a chemically-bound organic hydroxy compound, the total number of such molecules being, for example, from 2 to 5.

An example of a complex phosphate according to the invention is the complex phosphate containing ethyl alcohol and having the empirical formula $AlPClH_{25}C_8O_8$. The infra-red and X-ray characteristics of the compound are as hereinafter described. This compound is designated aluminium chlorophosphate ethanolate, for convenience referred to herein as ACPE, but it is to be understood that this designation in no way implies any particular molecular structure for the compound.

An example of a complex phosphate containing chemically-bound water is the complex phosphate containing chemically-bound water having the empirical formula $AlPClH_{11}O_9$. The infra-red and X-ray characteristics of the compound are as hereinafter described. This compound is designated aluminium chlorophosphate hydrate, for convenience referred to as ACPH, but it is to be understood that this designation in no way implies any particular molecular structure for the compound.

A further example of a complex phosphate is that containing bromine and ethyl alcohol having an empirical formula $AlPBrH_{25}C_8O_8$. The infra-red and X-ray characteristics of the compound are as hereinafter described. This compound is designated aluminium bromo-phosphate ethanolate, for convenience referred to as ABPE, but it is to be understood that this designation in no way implies any particular molecular structure for the compound.

The complex phosphates, containing at least one chemically-bound molecule of an organic hydroxy compound, are generally soluble in water and organic solvents, especially polar organic solvents. Complex phosphates containing chemically-bound water molecules are soluble in water. Their solubility in solvent mixtures increases as the proportion of polar solvent in the solvent mixture increases. Solvents comprising water and a water-miscible organic solvent are especially convenient for dissolving the complex phosphates. Solubility generally increases as the pH of the solution is decreased, and it is preferable to establish a pH of less than 2.5 in water solutions to maintain maximum solubility. The compounds of the invention generally give viscous solutions in water.

There is therefore further provided a homogeneous composition comprising a phosphate of aluminium and an organic solvent derived from a complex phosphate of the invention and an organic solvent. The composition may contain water or it may be substantially anhydrous. The organic solvent is preferably a liquid at ordinary temperatures. The organic solvent is preferably a polar solvent, especially an oxygen-containing polar solvent. Especially useful are aliphatic alcohols containing up to 10 carbon atoms, esters, polyhydric alcohols, and glycol esters. Most preferred are aliphatic alcohols containing from 1 to 5 carbon atoms, for example methanol or ethanol. The solvent may be a mixture of solvents. The ratio of the number of gram atoms of aluminium to the number of gram atoms of phosphorus in the composition may vary over a wide range, for example from 1:2 to 1.5:1, but is preferably substantially 1:1, as aluminium phosphate formed by decomposition of a composition having this ratio is especially stable.

The complex phosphates of the invention or a mixture containing the said complex phosphate, for example their solutions, may be prepared, for example, by reacting aluminium or an aluminium compound, preferably a halide, with a hydroxy compound R-OH and phosphoric acid, a phosphoric acid ester or a compound capable of forming phosphoric acid or a phosphoric acid ester. The aluminium halide may be a simple halide or an oxyhalide or an aluminium alkoxy halide, for example aluminium ethoxy chloride. Other suitable aluminium compounds include aluminium alkoxides, for example aluminium ethoxide. When aluminium or an aluminium compound other than a halide is used, the presence of a halogen acid is necessary. Mixtures of hydroxy compounds may be used. Substances capable of forming phosphoric acid or a phosphoric acid ester include phosphorus pentoxide, phosphorus oxyhalides and phosphorus halides. An aqueous solution of phosphoric acid may be used, conveniently an 88 percent solution in water, although it is preferred to ensure that no more than about 5 percent by weight of water based on the total weight of reaction mixture is present when a complex phosphate containing an organic hydroxy compound is prepared, thereby avoiding a loss of yield.

The order in which the reactants are added to one another is not critical; we prefer to add the aluminium compound to the hydroxy compound and then to react the phosphoric acid or phosphoric acid ester with the resultant mixture. It may be convenient to dissolve the aluminium compound in a suitable solvent, which may be either the hydroxy compound or an inert solvent, before reacting it further. This is especially convenient when the hydroxy compound is a solid at the temperature at which the reaction is carried out or when it is a poor solvent for the aluminium compound.

The highest yields of product are obtained when the molar ratio of aluminium to phosphorus in the reaction is substantially 1:1.

The reaction may be carried out over a wide range of temperature, but generally we prefer to use a temperature below 60°C and preferably from 0°C to 50°C, to obtain optimum yields.

It is preferred, for example when it is desired to preserve anhydrous conditions, to carry out the reaction in an atmosphere of a dry inert gas, for example, nitrogen.

Complex phosphates according to the invention containing chemically bound water molecules or a mixture containing the said complex phosphate may also be prepared by the hydrolysis of another complex phosphate of the invention which contains a chemically-bound organic hydroxy compound, or by carrying out the reactions hereinbefore described in the presence of water. By this means it is possible to replace, wholly or partially, the organic hydroxy compound with water molecules. It is especially convenient to use as starting material the complex phosphate having the empirical formula $AlPClH_{25}C_6O_8$. The partially hydrolysed product may be a single substance containing both chemically-bound water and the organic hydroxy compound or it may be a mixture of, for example, wholly hydrolysed and unhydrolysed molecules of the original complex phosphate. Polymerisation of the hydrolysis product may accompany hydrolysis so that higher molecular weight products of the invention are formed. Hydrolysis may be effected by any convenient means, but for many of the compounds of the invention it is sufficient to add water at room temperature or to keep the compounds in contact with moist air for a sufficient time. Conveniently this is done by fluidising the compound in a stream of humidified air, preferably at a temperature below 80°C.

The complex phosphate may be used without isolation from the mixture from which it is formed or after removal of part of the reaction products.

Thus the crude reaction produce mixture of the process employed may be used directly for at least some of the applications hereinafter described, for example, the coating of metals. Alternatively, a solid comprising the complex phosphate may be separated from the reaction mixture and used as such or optionally further purified before use. Separation of the product may be effecteed by any convenient means, for example by precipitation by cooling, evaporation of volatile constituents or addition of a further component, followed by filtration or by chromatography. In some cases spontaneous precipitation of the product from the reaction mixture occurs, and separation is effected simply by filtration. The product may be washed, for example with ethanol. The mother liquor left after separation of the product may be discarded or recycled for further use, preferably after purification from unwanted side-products of the reaction.

The complex phosphates according to the invention decompose on heating to give aluminium phosphate in amorphous or various crystalline forms. The temperature at which aluminium phosphate forms depends upon the particlar complex phosphate heated, but is normally from 80°C to 500°C, and is often below 100°C. It is convenient to heat the complex phosphate to a temperature from 100°C to 150°C to form aluminium phosphate. Surprisingly, crystal forms of aluminium phosphate can be obtained at low temperatures which are normally obtained only by heating aluminium phosphate to temperatures in excess of 800°C. The aluminium phospate may be further heated, for example to change its crystalline form. When the gram atom ratio of aluminium to phosphorus in the complex phosphate is 1:1 the aluminium phosphate produced has the same ratio of aluminium to phosphorus and is consequently particularly chemically stable.

The invention this provides a method for producing aluminium phosphate in many desirable forms at low temperatures, conveniently from solutions of the complex phosphates in water or organic solvents. The complex phosphates of the invention are therefore especially useful in providing means for producing, for example, formed bodies, coatings and binders comprising aluminium phosphate. The properties of aluminium phosphate are such as to confer on these materials desirable properties such as strength, refractoriness or chemical inertness.

Solutions of complex phosphates according to the invention may conveniently comprise additional components, for example materials which will aid the further processing of the solutions or desirably affect the products formed from the solutions. Thus organic materials, especially polymers, may be dissolved in the complex phosphate solution, especially in cases where the solvent is an organic solvent. Additional components, for example pigments, colorants or fillers, may likewise be dispersed in the solutions of the complex phosphates. It is especially preferred that the solution of complex phosphate comprises a material or materials which control the physical nature of the solid phase of aluminium phosphate which is produced from the solution, for example by heating. When the solvent comprises water it is preferred to use a crystallisation stabiliser, for example finely divided silica or alumina, or a nucleation activator or catalyst, for example dibutyl peroxide, or calcium, magnesium or sodium chloride. When the solution of the complex phosphate is non-aqueous, for example when the solvent is ethanol, it is preferred to use a boric acid ester or ether or a silicate acid ester or ether, for example methyl borate, trimethoxy boroxine or ethyl silicate to suppress the crystallisation of aluminium phosphate.

Solutions of the complex phosphates, especially aqueous solutions, are viscous, so that fibres may be prepared from them by one of the useful fiberising processes such as drawing, blowing, extrusion through a spinneret or centrifugal spinning. It is preferred for the solution to have a viscosity from 20 to 5000 poise, more preferably a viscosity from 200 to 3000 poise. The viscosity of non-aqueous solutions of the complex phosphates may conveniently be increased by dissolving in them a suitable polymer, for example hydroxypropyl cellulose or a polyamide.

The fibres may be dried by, for example, subjecting them to a vacuum and/or heating, usually to a temperature from 20°C to 100°C and they may be used in the dried form in, for example, a composite material, or they may be heated, preferably to a temperature of greater than 100°C, more preferably to a temperature of 100°C to 500°C, to produce a chemically-inert fibre. The duration of heating is preferably from 10 minutes to 1200 minutes. Drying under vacuum may be omitted in cases where the fibres are heated.

It is advantageous to apply tension to the fibre during the spinning stage to achieve a greater degree of orientation of the crystallites in the fibre. Tension may also be applied to the fibre with advantage while it is heated.

The fibres so produced may conveniently have mean diameters from 1 micron to 25 microns; it is preferred that the fibres be produced at a mean diameter of less than 10 microns. In cases where the fibre is heated to a temperature greater than 100°C after fiberising, and starting compounds have a gram atom ratio of aluminium to phosphorus of unity, the said fibre comprises aluminium phosphate having a similar gram atom ratio of aluminium to phosphorus and which is either in the amorphous form or in one of its crystalline modifications, Berlinite, Tridymite or Cristobalite. Fibres which have been heated to a temperature greater than 100°C may be subjected to a temperature greater than the melting point, for example, by passing them through a plasma torch and cooling them rapidly to produce a vitreous form of fibre.

Orientation of the crystallites in the fibre may be increased by drawing the fibre during spinning.

The solutions of the complex phosphates may be filtered, for example through a microporous filter, before fibres are formed from them, so that adventitious nuclei may be removed and prevented from affecting the crystallisation of the aluminium phosphate. Additives for controlling crystallisation of aluminium phosphate from aqueous solutions of the complex phosphates may be employed as hereinbefore described.

ACPE, ACPH and ABPE are complex phosphates especially suitable for the preparation of fibres, for example from water solution.

Various additives may be incorporated in the fibres, for example by adding them to the solution from which the fibres are formed. Examples of additives which may with advantage be so used are a. grain growth inhibitors, for example fine magnesium oxide or aluminium oxide,
b. fine aluminium phosphate,
c. phase change stabilisers,
d. reinforcing particles such as silica or graphite,
and e. crystallisation suppression agents for example colloidal silica.

The inorganic fibres are thermally stable, usually to at least 1600°C, and are chemically inert and may be used as refractory insulation or, in their strong forms, as reinforcing fibres for resins, metals such as aluminium, ceramics, fired clay-ware and glass.

A fibre comprising aluminium phosphate and an organic material may be produced by fiberising a solution of the complex phosphate containing a dissolved organic compound; for example a methanol solution comprising aluminium chlorophosphate ethanolate and an alcohol-soluble polyamide may be spun and the resulting fibre heated to 100°C–200°C to produce a composite fibre.

Solutions of the complex phosphate in water or organic solvents may be used to produce coatings of aluminium phosphate for a number of surfaces, by removal of solvent and preferably heating of the deposited coating. The duration of heating is preferably at least 10 minutes. The form of aluminium phosphate produced will depend, amongst other things, upon the temperature to which the coating is heated, although a temperature of at least 80°C is normally sufficient to form a coat of aluminium phosphate. Preferably the coating is heated to a temperature from 100°C to 200°C. The coating may be further heated to polymerise the deposit or to change the crystal form of aluminium phosphate. Especially for coatings produced from a solution of complex phosphate in organic solvents, the aluminium phosphate may be prevented from crystallising by the use of boric acid esters or ethers or silicic acid esters or ethers as hereinbefore described. Organic materials, preferably polymers, may be dissolved in the solutions from which the coatings are produced to give coatings comprising an organic material and aluminium phosphate. It is advantageous to add a suitable wetting agent to the coating solution to assist uniform coating. Other components, for example pigments, may be incorporated in the coating by including them in the coating solution.

The invention therefore provides a method for coating any substrate, for example glass, carbon, metals, ceramics or organic polymers, with a heat-stable, inert, transparent, hard film of aluminium phospate. It is preferable for the substrate to be capable of withstanding a temperature of at least 80°C; for substrates which will not withstand this temperature, the coating is preferably heated by a method which does not heat the surface on which is is deposited, for example, by micro-wave heating. The coating of aluminium phosphate is useful in a number of ways, for example protection of the substrate against corrosion, heat, or abrasion. Any desired shape of substrate surface may be coated, for example fibres, film, powders and manufactured objects. ACPE, especially when dissolved in a polar solvent, is especially useful for providing a coating solution. Surfaces coated with aluminium phosphate may be coated with a further component, for example with a metal such as aluminium.

Solutions of the complex phosphates are especially useful for coating glass since bonding between the glass surface and aluminium phosphate is very good. It is especially advantageous if the coating is applied immediately the glass is formed from its melt. The sizing of glass fibre by means of solutions of the complex phosphates is particularly useful. The solution is preferably applied to the glass fibre immediately after the fibre is extruded. After application, the solution is dried either in a vacuum or by heating or by a combination of both. Heating of the coating to form aluminium phosphate, which is preferred to herein as curing, may be combined with the drying stage. For example, if ethyl cellosolve is used as solvent for the complex phosphate, curing and drying may be carried out at the boiling point of the solvent, which is 135°C. When, however, the solvent is removed at a temperature less than about 80°C, further heating of the coating at a temperature of at least 80°C is necessary to effect curing. Solutions of the complex phosphates in organic solvents may comprise materials such as organic-silanes or organic resins such as hydroxypropyl cellulose, epoxy resin or low molecular weight urea-formaldehyde resin to assist the formation of an impermeable coat; the resin should be capble of withstanding a temperature of at least 100°C and could, with advantage, be capable of cross-linking at this temperature. Crystallisation-control additives may be incorporated in the coating solutions, for example methyl borate or ethyl silicate.

Other coatings may be applied to the coated glass, for example a resin. Glass coated with aluminium phosphate may be treated with an agent, for example an organic-silicon compound, to aid the incorporation of glass fibre in resin matrices.

Glass thus coated is considerably stronger than uncoated glass, and is resistant to abrasion. It is also more resistant to chemical attack from, for example, alkaline materials and can thus be used in contact with materials which normally damage glass, for example cement.

Forms of glass other than glass fibre may be coated as hereinbefore described, for example sheet glass and glass articles generally. Glass coated with aluminium phosphate may be further coated with a material which adheres to aluminium phosphate, for example aluminium. Glass fibre thereby coated with aluminium can readily form useful composite materials of glass fibre and aluminium, for example by compression, preferably at an elevated temperature, of a mass of coated glass fibre.

The use of complex phosphates to provide a coating of aluminium phosphate for carbon fibre is especially advantageous. The carbon fibre may, for example, be immersed in solutions of the complex phosphates in water or organic solvents, for example polar solvents such as ethanol, excess solution drained off and the fibre dried, conveniently by heating the fibre in air at temperatures from 90°C to 25°C. Optionally, the fibre may be degresed in, for example, trichloroethylene before application of the solution. The coating may be cured by heating, preferably in an inert gas, for example nitrogen, at a temperature greater than 100°C, conveniently at from 100°C to 500°C, although if drying has taken place at above about 100°C, curing is not always necessary. A coating of aluminium phosphate thus provided on carbon fibre markedly increases the resistance of the fibre to oxidation and protects the fibre surface from interaction between it and other materials with which it comes into contact. Protection may therefore be afforded to the carbon fibre when it is incorporated in materials such as molten metals, for example aluminium, to provide reinforcement for the solid metal. Coating of carbon fibre with aluminium phosphate enables the fibre to be coated further with a film of aluminium metal or glass. Composite materials may be produced by compressing "bundles" of fibres so coated, at high temperature. The coating also produces stronger bonding between the carbon fibre and a siliceous material in which it is incorporated.

The complex phosphates may be applied as a glass or decorative coating to clay-ware or ceramic objects and are useful in general for coating any body which forms a strong bond with aluminium phosphate, although it will be understood that their use is not restricted to examples where such strong bonds are possible. Ceramic fibres may usefully be coated, for example asbestos, silicon carbide fibre and boron fibre.

Aluminium phosphate applied to metal surfaces by means of the complex phosphates provides coatings which are corrosion-resistant, heat-resistant and electrically-insulating. The coating of aluminium and steel is especially useful. Metal wires may conveniently be protected by the coatings. Corrosion inhibitors, for example glyceryl monolaurate, may be included in the coating solution.

Polymeric organic materials, for example synthetic fibres of nylon or a polyester may conveniently be coated with aluminium phosphate or a mixture comprising aluminium phosphate and an organic material. Drying and curing of the coating may be carried out by any convenient method of heating if the polymer will withstand a temperature of at least 80°C.

In a further embodiment of the invention, a solution comprising one or more of the complex phosphates may be used as an adhesive or binder for a wide variety of materials. It is especially useful as an adhesive or binder for siliceous materials, for example sand or glass; metal especially meta powders and ceramic materials generally, for example alumina or carbon. The adhesive bond may be strengthened by heating, preferably to temperatures between 200°C and 1000°C, after removal of solvent and initial curing at 100°C to 200°C of the adhesive or binder.

Strong, thermally stable and chemically inert resistant composite materials may be prepared by incorporating aligned or random fibres, for example glass fibre, carbon fibre, silicon carbide fibre or asbestos with a desired quantity of a solution of the complex phosphates in water or a polar solvent, removal of the solvent, initial curing at 100°C to 200°C and preferably further heating, for example to a temperature of from 200°C to 1000°C.

The complex phosphates may also be used to prepare fine particles of aluminium phosphate by rapid heating of the bulk material to a temperature greater than 900°C, and grinding the resultant mass. Fine particles produced in this way may advantageously be used as a reinforcing filler in polymers such as polyvinyl chloride or they may be incorporated into molten glass as a nucleating agent in the prepartion of nucleated glass.

The invention is illustrated but not limited by the following Examples:

EXAMPLE 1

40 gram of anhydrous aluminium chloride was added to 300 ml of laboratory grade ethyl alcohol. The resultant solution was cooled to 0°C and 18.6 ml of 88% orthophosphoric acid was added to it in a drop-wise manner and the reaction mixture stirred. The reaction was carried out in an atmosphere of dry nitrogen. The white crystalline material formed was separated from the mixture, washed with ethanol and dried under vacuum at a temperature of 0°C. 70 gram of product was obtained.

The product compound had the empirical formula $AlPClH_{25}C_8O_8$ and on a dry basis gave the following chemical analysis (expressed as a percentage by weight):

| Al | P | Cl | C | H |
|---|---|---|---|---|
| 7.87 | 9.04 | 10.34 | 28.03 | 7.35 | and contained 53.76 percent by weight of chemically-bound ethyl alcohol. The infra-red absorption spectrum of the compound containing a trace of water was measured using the liquid paraffin mull technique. The principal band positions are given in Table I which indicates the relative strengths of the bands.

Table I

| Band positions in reciprocal centimetres | | | |
|---|---|---|---|
| 3450 | strong | 970 | weak |
| 1920 | weak | 935 | weak |
| 1635 | weak | 900 | medium strong |
| 1230 | very strong | 870 | medium strong |
| 1100 | strong | 800 | weak |
| 1075 | strong | 715 | medium strong |
| 1030 | very strong | | |

A specially dried sample gave infra-red absorption spectrum band positions shown in Table II:

Table II

| Band positions in reciprocal centimetres | | | |
|---|---|---|---|
| 3450 | medium strong | 905 | strong |
| 3100 | strong | 880 | strong |
| 1235 | very strong | 660 | medium strong |
| 1110 | very strong | 625 | medium strong |
| 1095 } 1085 } | medium strong | 520 | strong |
| 1045 | very strong | 390 | medium strong |

The X-ray powder data were also obtained for the compound containing a trace of water, using a Philips powder camera, CuKa radiation and a nickel filter. The intensities were obtained by visual observation. The data obtained are shown in Table III:

Table III

| X-ray powder data | | | | | |
|---|---|---|---|---|---|
| dA | I/Io | dA | I/Io | dA | I/Io |
| 10.7 | vs | 2.94 | vw | 2.097 | vvw |
| 7.2 | vw | 2.89 | vvw | 2.034 | vvw |
| 6.25 | w | 2.81 | w | 1.967 | vvw |
| 5.24 | w | 2.72 | vvw | 1.951 | vvw |
| 4.87 | w | 2.64 | vw | 1.899 | vvw |
| 4.57 | vw | 2.60 | vvw | 1.866 | vvw |
| 4.04 | m | 2.54 | vvw | 1.786 | vvw |
| 3.62 | s | 2.489 | vw | 1.660 | vvw |
| 3.44 | s | 2.460 | vvw | 1.627 | vvw |
| 3.25 | vvw | 2.279 | vw | 1.594 | vvw |

Table III-Continued

| X-ray powder data | | | | | |
|---|---|---|---|---|---|
| dA | I/Io | dA | I/Io | dA | I/Io |
| 3.18 | vw | 2.236 | vvw | 1.553 | vvw |
| 3.11 | vvw | 2.174 | vvw | 1.528 | vvw |
| 3.02 | w | 2.132 | vvw | | | s = strong; v = very; w = weak; m = medium

A differential thermal analysis was carried out on a sample of the compound which contained a small quantity of water. The thermogram covered the range 0°–800°C and was carried out under nitrogen. Sharp endothermic peaks at 82°C and 96°C and a broad endothermic inflection at approximately 175°C were observed.

EXAMPLE 2

10 gram of the compound produced in Example 1 was placed in a tray to a depth of one-fourth-inch and left for 24 hours at a temperature of 20°C and in a relative humidity of 75 percent. The compound lost 16 percent of its weight to yield another compound which was amorphous. The contact of chemically-bound ethyl alcohol had fallen to 26 percent by weight and the amount of chemically-bound water had increased to 22 percent by weight. The compound contained 10.84 percent by weight of aluminium 12.25 percent by weight of phosphorus and 12.75 percent by weight of chlorine.

EXAMPLE 3

The conditions used in Example 2 were repeated except that the test was continued for 48 hours. The resultant amorphous product contained 12.4 percent by weight of chemically bound ethyl alcohol and 32 percent by weight of chemically-bound water. The compound contained 11.34 percent by weight of aluminium, 12.82 percent by weight of phosphorus and 12.61 percent by weight of chlorine.

EXAMPLE 4

The conditions used in Example 2 were repeated except that the test was continued for 6 days. The resultant amorphous product contained 0.1 percent by weight of chemically bound ethyl alcohol and 35.1 percent by weight of chemically bound water. The compound contained 11.32 percent by weight of aluminium, 12.70 percent by weight of phosphorus and 11.84 percent by weight of chlorine.

EXAMPLE 5

300 gram of the compound $AlPClH_{25}C_8O_8$ prepared as described in Example 1 was placed in a 4-inch diameter tube fitted with a No. G2 glass sinter near its base. Compressed air was blown through the compound at a rate of 20 litres per hour for 92 hours. A dry amorphous powder was formed containing 12.4 percent by weight of aluminium, 11.6 percent by weight of chlorine, 14.5 percent by weight of phosphorus and 30 percent by weight of chemically-bound water.

A differential thermal analysis of a sample was carried out. The thermogram showed two endothermic peaks at about 108°C and 160°C.

EXAMPLE 6

15.2 gram of anhydrous aluminium chloride was added slowly to 40 ml of distilled water. The resultant solution was cooled to ambient temperature and 7.4 ml of an 88 percent solution of orthophosphoric acid added to it with stirring. The solution was then concentrated by heating to a volume of about 20 ml. A viscous yellow-brown liquid was formed which, after several days' standing in a crystallising dish, produced a crop of crystals. The crystals were filtered off, washed with ethanol and dried in a vacuum desiccator. The chemical analysis of the crystals gave aluminium 10.6 percent by weight, chlorine 14.5 percent by weight, phosphorus 12.4 percent by weight, water 40.1 percent by weight. This analysis corresponded well with the empirical formula $AlPClH_{11}O_9$. The X-ray powder pattern was obtained for the crystals using a Philips powder camera, CuKa radiation and a nickel filter. The intensities were obtained by visual observation, and the data are shown in Table IV:

Table IV

| Intensity | Value |
|---|---|
| s | 9.20 |
| vw | 7.31 |
| w | 6.68 |
| vw | 5.78 |
| vvw | 5.50 |
| vw | 5.02 |
| wm | 4.55 |
| w | 4.24 |
| w | 4.08 |
| wm | 3.931 |
| w+ | 3.705 |
| w− | 3.504 |
| w | 3.411 |
| w | 3.276 |
| w+ | 3.184 |
| w+ | 3.123 |
| m | 3.030 |
| m− | 2.966 |
| w | 2.886 |
| w | 2.824 |
| w− | 2.676 |
| w− | 2.600 |
| w+ | 2.427 |
| w | 2.263 |
| w | 2.225 |
| vw | 2.141 |
| m | 2.094 |
| vw | 2.062 |
| vw | 2.023 |
| w− | 1.979 |
| w | 1.914 |
| vw | 1.850 |
| wm | 1.819 | s = strong; v = very; w = weak; m = medium

EXAMPLE 7

26.7 gram of anhydrous aluminium bromide were dissolved in a mixture of 100 ml of absolute ethyl alcohol and 9.8 gram of 88 percent orthophosphoric acid. The mixture was warmed gently to assist dissolution and the final clear liquid allowed to cool. After a short period of time a crystalline precipitate was formed. This was filtered off and dried in a vacuum desiccator. The chemical analysis of the crystals was as follows:

| | Al | Br | P | $C_2H_5OH$ | $H_2O$ |
|---|---|---|---|---|---|
| % by weight | 6.8 | 20.3 | 7.6 | 47.0 | 0.7 |

On a dry basis, the crystals have an empirical formula of $AlPBrH_{25}C_8O_8$. X-ray powder data on the crystals were obtained using a Philips powder camera, CuKa radiation and a nickel filter, the intensities being obtained by visual observation. The data are shown in Table V:

Table V

| Intensity | Value |
|---|---|
| s++ | 10.773 |
| vvvw | 8.927 |
| w | 7.824 |
| w | 7.339 |
| w−w+ | 6.189 |
| vvw | 5.786 |
| m− | 5.368 |
| w−w+ | 4.911 |
| w−w− | 4.692 |
| vvw− | 4.414 |
| m−m− | 4.130 |
| m+−m++ | 3.682 |
| vw | 3.573 |
| m++ | 3.490 |
| w−w+ | 3.241 |
| w | 3.151 |
| m−− | 3.066 |
| m−− | 2.996 |
| vw | 2.967 |
| w−vw | 2.892 |
| w−w+ | 2.838 |
| vw | 1.564 | s = strong; v = very; w = weak; m = medium

A differential thermal analysis was carried out over the range 0°–800°C under nitrogen. A sharp endothermal peak at 108°C and a broad endothermal inflection at about 175°C were observed.

The infra-red absorption spectra of the compound was measured using the liquid paraffin mull technique. The principal band positions are shown in Table VI:

Table VI

| Band position in reciprocal centimetres | | | |
|---|---|---|---|
| 3450 | medium strong | 1038 | very strong |
| 3140 | strong | 902 | strong |
| 1414 | medium strong | 880 | strong |
| 1240 | very strong | 615 | medium strong |
| 1112 | very strong | 520 | strong |
| 1090 } 1080 } | medium strong | 385 | weak-medium strong |

EXAMPLE 8

26.7 gram anhydrous aluminium chloride was dissolved in 700 ml of n-propyl alcohol and to this solution 19.6 gram 88 percent orthophosphoric acid was added to give a clear solution. To this solution a large excess of specially dried diethyl ether was added. A white amorphous precipitate was formed, which was filtered off and dried. The material had the following analysis:

| | Al | Cl | P | $H_2O$ | n-propyl alcohol |
|---|---|---|---|---|---|
| % by weight | 10.7 | 7.6 | 12.1 | 9.6 | 32.2 |

EXAMPLE 9

13.4 gram of anhydrous aluminium chloride was dissolved in 100 ml of n-decanol, and to the solution 9.8 gram of 88 percent orthophosphoric acid was added. The reaction mixture was filtered. A large excess of diethyl ether was added to the filtrate and a white product was precipitated, having the following analysis:

| % by weight | Al | Cl | P | $H_2O$ | n-decanol |
|---|---|---|---|---|---|
| | 10.4 | 10.7 | 13.4 | 20.8 | 10.7 |

EXAMPLE 10

40.05 gram anhydrous aluminium chloride was dissolved in 250 ml of isopropyl alcohol. 29.4 gram of 88 percent orthophosphoric acid was added to give a clear solution. The addition of a large excess of diethyl ether to this solution resulted in the precipitation of a white amorphous solid having the following analysis:

| % by weight | Al | Cl | P | $H_2O$ | isopropyl alcohol |
|---|---|---|---|---|---|
| | 10.9 | 13.7 | 12.3 | 22.7 | 13.5 |

When specially dried diethyl ether was used the product had the following analysis:

| % by weight | Al | Cl | P | $H_2O$ | isopropyl alcohol |
|---|---|---|---|---|---|
| | 10.7 | 8.3 | 11.9 | 15.2 | 31.7 |

EXAMPLE 11

The compound prepared as described in Example 1 was dissolved in a number of solvents and each saturated solution was analysed. The results obtained are shown in Table VII:

Table VII

| Solvent | Solubility g solid/100 ml solvent | Analysis |||||
|---|---|---|---|---|---|---|
| | | Al | $PO_4$ | Cl | $C_2H_5OH$ | Solvent |
| N-pentanol | 10 | 0.86 | 3.04 | 1.13 | 5.90 | 89.07 |
| Ethanol | 11 | 0.96 | 3.39 | 1.26 | 94.39 | — |
| Isopropanol | 26 | 1.96 | 6.90 | 2.57 | 13.37 | 75.20 |
| Methanol | 90 | 4.19 | 14.75 | 5.50 | 28.60 | 46.96 |
| Water | 1000 | 7.15 | 25.19 | 9.40 | 48.88 | 9.38 |

EXAMPLE 12

A clear solution was obtained by dissolving 26.7 gram of anhydrous aluminium chloride in 200 ml of methanol and adding 19.6 gram of 88 percent orthophosphoric acid. This solution was concentrated by evaporation to a thick syrup, useful as a coating solution hereinbefore described.

EXAMPLE 13

6.64 gram of dry hydrochloric acid gas was dissolved in 185 gram of isopropyl alcohol and 33.1 gram of ethyl alcohol. To this solution 17.9 gram of 88 percent orthophosphoric acid was added. To this resultant solution 37.25 gram of aluminium isopropoxide was added and stirred to dissolve. The solution was filtered and the filtrate had the following chemical analysis:

| % by weight | Al | Cl | P | $H_2O$ | organic solvent |
|---|---|---|---|---|---|
| | 2.1 | 2.2 | 2.1 | 2.6 | 86.7 |

EXAMPLE 14

400 gram of anhydrous aluminium chloride was dissolved in 3000 ml of absolute ethanol and the solution cooled in ice to a temperature of 0°C. 325 gram of 88 percent orthophosphoric acid was slowly added to the solution with stirring. 370 gram of a white crystalline solid with the empirical formula $AlPClH_{25}C_8O_8$ was filtered off and dried in a vacuum oven at 20°C for two hours.

A solution of 800 gram of this solid in 100 gram of water was prepared; the solution had a viscosity of 700 poise.

Monofilaments were drawn from the solution into air at a temperature of 20°C. The collected monofilaments were dried at 120°C and transferred to an oven at 500°C where they were kept for 4 hours. The resulting product consisted of clear fibres of essentially aluminium phosphate.

EXAMPLE 15

The crystalline solid of empirical formula $AlPClH_{25}C_8O_8$ was prepared as described in Example 14.

600 gram of the solid was dissolved in 150 ml of water to give a solution having a viscosity of 20 poise.

This solution was introduced into a centrifuge spinning device (a "candy-floss" machine) in which it was spun. Fibres of diameter from 5 micron to 15 micron were readily produced. They were placed in an oven at 500°C for 30 minutes, after which time they were clear fibres consisting essentially of aluminium phosphate.

EXAMPLE 16

A concentrated (approximately 5 molar) solution of the compound prepared as described in Example 5 was made up in water. This had a viscosity of 2600 poise, and from it continuous monofilaments were drawn from a spinneret. On heating, the monofilaments lost about 45 percent in weight. The monofilaments (mean diameter 15 microns) were clear and were shown by X-ray analysis to be essentially crystalline aluminium phosphate. Table VIII shows the analysis of the filaments produced and the results of the particular heating treatment given to each sample.

TABLE VIII

| Sample | Weight % Al | Weight % $PO_4$ | Weight % Cl | Heat Treatment || X-Ray Examination | Comments | % Weight loss on heat treatment |
|---|---|---|---|---|---|---|---|---|
| | | | | Time Hrs | Temp °C | | | |
| A | 18.2 | 68.0 | 2.0 | 2 | 250 | Major phase cristobalite, minor phase tridymite | Thin fibres, clear | not determined |
| B | 17.56 | 70.05 | 2.86 | 16½ | 250 | Major phase tridymite, minor phase cristobalite | Thin fibres, clear | 44.03 |
| C | 20.97 | 75.33 | 0.25 | 2 | 500;550 | Major phase cristobalite, minor phase tridymite | Thin fibres, clear | 46.21 |
| D | 21.00 | 72.87 | 0.28 | 5 | 700 | Major phase tridymite, minor phase cristobalite | Thin fibres, clear | 45.13 |
| E | 19.86 | 79.49 | Hot detected | 4 | 900–950 | Major phase tridymite, minor phase cristobalite | Thin fibres, clear | 46.29 |

EXAMPLE 17

A solution was prepared as in Example 16 and various additional components added to portions of the solution. Filaments of about 10 microns diameter were drawn from each portion and samples were heated for different times. The filaments were examined by X-ray diffraction. The results obtained are shown in Table IX:

3 hours under nitrogen. The final filament comprised aluminium phosphate in the cristobalite form and about 60 percent by weight of aligned graphite platelets.

EXAMPLE 19

Solutions of the compound prepared as described in

TABLE IX

The Effect of Various Additives on the Crystallisation of $AlPO_4$ Fibres

| Addition to Solution | Firing Temp °C | Time at Temp Hrs | X-Ray Examination |
|---|---|---|---|
| Nil | 200 | 3 | Largely non-crystalline + trace of tridymite |
|  | 400 | 3 | Largely non-crystalline + trace of tridymite |
|  | 800 | 3 | Some non-crystalline + tridymite (major phase) + cristobalite (minor phase) |
|  | 1000 | 3 | Mainly crystalline, largely cristobalite + some non-crystalline |
| 5% $AlCl_3$ | 200 | 3 | Non-crystalline |
|  | 400 | 3 | Largely non-crystalline + trace crystalline too weak to identify |
|  | 800 | 3 | Largely non-crystalline + trace of tridymite |
|  | 1090 | 3 | Some non-crystalline + tridymite and cristobalite ($>10^{-5}$ cm) |
| Alumina hydrate | 200 | 3 | Largely non-crystalline ($<<10^{-5}$ cm) +trace tridymite ($>10^{-3}$ cm) |
|  | 400 | 3 | Largely non-crystalline + slightly more tridymite than fired 200°C |
|  | 800 | 3 | Largely non-crystalline + tridymite ($>10^{-5}$ cm) |
|  | 1090 | 3 | Some non-crystalline + tridymite and cristobalite ($>10^{-5}$ more crystallinity than 200 and 400°C |
| 5% $H_3PO_4$ | 200 (−200) | 3 | Non-crystalline material present. Cristobalite + Berlinite present |
|  | 400 | 3 | Some non-crystalline present. Crystalline phase present in Berlinite ($>10^{-5}$ cm) |
|  | 800 | 3 | Highly crystalline, any non-crystalline phase low concentration. Major crystalline phase Berlinite + Cristobalite |
|  | 1090 | 3 | Highly crystalline, major phase cristobalite + trace Berlinite + trace unidentified phase ($>10^{-4}$ cm) |
| 5% $SiO_2$ (Silica Sol.) | 200 | 3 | Largely non-crystalline ($<<10^{-5}$ cm) + trace tridymite ($>10^{-5}$ cm) |
|  | 400 | 3 | Large proportion non-crystalline + tridymite ($>10^{-5}$) |
|  | 800 | 3 | Some non-crystalline. Major phase is tridymite + very minor amount cristobalite ($>10^{-5}$ cm) |
|  | 1090 | 3 | Some non-crystalline + tridymite and cristobalite ($>10^{-5}$) (similar to ACPH + 5% alumina with slightly lower proportion of crystalline material) |

EXAMPLE 18

A 30 percent by weight aqueous suspension of a colloidal graphite was prepared. To 100 ml of this was added 50 gram of the compound prepared as described in Example 5, and the suspension well mixed. The suspension was extruded at 25°C through a spinneret having an aperture of 1/100 inch and the resultant monofilament drawn down to 10 microns. The drawn filament was heated for 1 hour at 150°C and then at 800°C for Example 1 were made up in methanol and isopropyl alcohol. To portions of each solution, ethyl silicate was added and dissolved. Solutions with and without ethyl silicate were evaporated to dryness at 120°C and the solids formed were ground to a fine powder. This powder was then heated at various temperatures for various periods of time and the products examined by X-ray diffraction techniques. The results of the inclusion of ethyl silicate on the crystallisation of aluminium phosphate from the solutions is shown in Table X:

TABLE X

The effect of Ethyl Silicate on the Crystallisation of $AlPO_4$

| Heating Temperature °C | Heating Time Hrs | Isopropyl Alcohol Solutions | | Methanol Solutions | |
|---|---|---|---|---|---|
|  |  | containing ethyl silicate | no ethyl silicate | containing ethyl silicate | no ethyl silicate |
| 200 | 2 | Largely non-crystalline (size $<<10^{-5}$ cm) | Non-crystalline | — | — |
| 300 | 3 | — | — | Non-crystalline | Non-crystalline |
| 400 | 2 | Non-crystalline | Non-crystalline | — | — |
| 600 | 3 | — | — | Non-crystalline | Non-crystalline |
| 800 | 2 | Non-crystalline | Largely non-crystalline + trace tridymite $\leqslant 10^{-5}$ | — | — |
| 1000 | 2/3 | Largely non-crystalline + trace of a crystalline material too weak to identify | Highly crystalline $AlPO_4$ cristobalite + tridymite phase. Average cryst size $\geqslant 10^{-5}$ cm | Non-crystalline | Highly crystalline $AlPO_4$. Cristobalite + tridymite forms. Average crystallite size $\geqslant 10^{-5}$ cm |

EXAMPLE 20

A 10 percent by weight solution of the compound prepared as described in Example 1 in methanol was applied to a glass fibre immediately after it had been drawn. The coated glass fibre was then heated for 1 hour at 150°C. The tensile strength of the coated glass fibre was 50 percent higher on average than that of the uncoated glass fibre drawn at the same time and under the same conditions.

EXAMPLE 21

A solution containing 2 percent by weight of the compound prepared as described in Example 1 was made up in ethyl alcohol and to it was added 0.1 percent by weight of a wetting agent. Glass slides were then dipped into the solution, drained and heated at the following temperatures - 120°C, 250°C, 350°C, 450°C and 550°C for 2 hours. The slides were immersed in a suspension of cement in water. No reduction in the thickness of the film of aluminium phosphate on the glass occurred, as examined microscopically and gravimetrically, after 65 hours of immersion at 20°c.

EXAMPLE 22

The crystalline solid of empirical formula $AlPClH_{25}C_8O_8$ was prepared as described in Example 14.

10 gram of the solid was dissolved in 100 ml of ethanol. Carbon fibres were immersed in the solution, withdrawn and dried, first in air and then at 150°C for 15 minutes. The fibre, which was found to have absorbed 5 percent of its weight after this treatment, was heated at 950°C for 5 hours in an atmosphere of dry nitrogen.

Similar weights of untreated carbon fibre and carbon fibre coated as above were treated for 2 hours in a stream of air. Table XI shows the loss of weight of the carbon fibre samples when heated at four different temperatures and illustrates the protection against oxidative degradation afforded by the coating.

Table XI

Loss of weight of coated and uncoated carbon fibre

| Temperature °C | Uncoated fibre % weight loss in 2 hours | Coated fibre % weight loss in 2 hours |
| --- | --- | --- |
| 300 | 0 | 0 |
| 400 | 0 | 0 |
| 500 | 19 | 1.3 |
| 700 | 100 | 3.9 |

EXAMPLE 23

Carbon fibre was degreased by immersion in trichloroethylene and passed through solutions of the compound prepared as described in Example 1 in three different solvents, water, ethyl alcohol and methanol. The fibre was dried at 250°C and the coating cured by further heating at 500°C. The increased resistance to oxidation of the carbon fibre as a result of the coating is shown in Table XII:

Table XII

| Coating Solution | Deposit % w/w* | % Lose in Weight after Heating in Air for 2 hours | | |
| --- | --- | --- | --- | --- |
| | | 500°C | 600°C | 700°C |
| 2% complex in water | — | 1.3 | 12.9 | 99.8 |
| 10% complex in water | 2 | 0.7 | 99.1 | 89.4 |
| 2% complex in methanol | <0.1 | 1.3 | 27.5 | 96.9 |
| 10% Complex in methanol | 2 | 0 | 18.5 | 97.3 |
| 2% complex in ethanol | 0.6 | 1.1 | 12.5 | 98.8 |
| 8.7% complex in ethanol | 4.7 | 1.1 | 21.7 | 97.6 |
| Double coating with 2% solution complex in ethanol | 4.4 | 0 | 14.1 | 91.6 |
| UNTREATED FIBRE | — | 56.4 | 100 | 100 |

* after drying at 250°C

EXAMPLE 24

Carbon fibre was coated with 4 percent by weight of aluminium phosphate by treatment as in Example 23 with a 2 percent by weight solution of complex phosphate in ethyl alcohol. The weight loss of the coated fibre compared with that of an uncoated fibre when they were both heated at 600°C in air was recorded at intervals of time. The results obtained are shown in Table XIII, showing that the rate of oxidation is very considerably reduced by the presence of the coating.

Table XIII

| Time at 600°C in air (minutes) | Weight loss % w/w | |
| --- | --- | --- |
| | uncoated fibre | coated fibre |
| 15 | 60.6 | 5.4 |
| 30 | 97.1 | 7.9 |
| 45 | 98.5 | 9.0 |
| 60 | 99.6 | 10.1 |
| 75 | 100 | 10.1 |

EXAMPLE 25

The mechanical properties of uncoated carbon fibre coated as described in Example 24 were compared by measuring their Young's modulus and tensile strength. The results shown in Table XIV were obtained, showing the beneficial effect of the coating on the mechanical properties after exposure of the fibre to oxidising conditions.

Table XIV

| | Fibre and treatment | Modulus lbf/in² | Tensile Strength lbf/in² |
| --- | --- | --- | --- |
| (1) | Uncoated Fibre | 25–28×10⁶ | 28–29×10⁴ |
| (2) | Uncoated Fibre heated in air 10 minutes at 600°C | —too fragile to test— | |
| (3) | AlPO₄ coated (4%) | 22–25×10⁶ | 21–35×10⁴ |
| (4) | As (3) but heated in air 10 minutes at 600°C | 29×10⁶ | 20×10⁴ |
| (5) | AlPO₄ coated (3.6%) | 23–33×10⁶ | 18–34×10⁴ |
| (6) | As (5) but heated in air 10 minutes at 600°C | 21–23×10⁶ | 12–×10⁴ |

EXAMPLE 26

Carbon fibre was passed through molten aluminium. Only a few isolated globules of aluminium adhered to the fibre. Carbon fibre coated with 2 percent of aluminium phosphate by the process described in Example 24 was similarly passed through molten aluminium. It emerged with a continuous and adherent film of aluminium metal on its surface.

What we claim is:

1. A method of preparing a complex phosphate of aluminium other than a phosphate ester wherein said complex phosphate contains at least one chemically bound molecule of an alcohol, which comprises interacting an aluminum compound selected from the group consisting essentially of aluminium halides, aluminium oxyhalides, aluminium alkoxyhalides and aluminium alkoxides with an alcohol containing one to ten carbon atoms and phosphoric acid and, when the aluminium compound is an alkoxide, a halogen acid.

2. A method as claimed in claim 1 wherein the aluminium compound is aluminium chloride.

3. A method as claimed in claim 1 wherein the aluminium halide is added to the alcohol and phosphoric acid reacted with the resultant mixture.

4. A method as claimed in claim 1 wherein the reaction is carried out at a temperature of from 0° to 50°C.

5. A method as claimed in claim 1 wherein the complex phosphate is partially hydrolyzed to produce a complex phosphate containing at least one chemically bound molecule of water and at least one chemically bound molecule of the said alcohol.

6. A method as claimed in claim 5 wherein the complex phosphate used as the starting material is the complex phosphate having the empirical formula $AlPClH_{25}C_8O_8$.

7. A complex phosphate produced by interacting an aluminium compound selected from the group consisting essentially of aluminium halides, aluminium oxyhalides, aluminium alkoxyhalides, aluminium alkoxides, with an alcohol containing one to ten carbon atoms and phosphoric acid and, when the aluminium compound is an alkoxide, a halogen acid.

8. A complex phosphate as claimed in claim 7 wherein the alcohol contains one to four carbon atoms.

9. A complex phosphate as claimed in claim 8 wherein the alcohol is ethyl alcohol.

10. A complex phosphate as claimed in claim 7 wherein the halogen is chloride.

11. A complex phosphate as claimed in claim 7 wherein the ratio of the number of gram atmos of aluminium to the number of gram atoms of phosphorus is substantially 1:1.

12. A complex phosphate as claimed in claim 7 wherein the ratio of the number of gram atoms of aluminium to the number of gram atoms of halogen is substantially 1:1.

13. A complex phosphate prepared by partially hydrolyzing the complex phosphate produced by claim 1 to produce a complex phosphate containing at least one chemically-bound molecule of water and at least one chemically-bound molecule of the said alcohol.

14. A complex phosphate as claimed in claim 7 having the empirical formula $AlPClH_{25}C_8O_8$.

15. A complex phosphate as claimed in claim 7 having the empirical formula $AlPBrH_{25}C_8O_8$.

* * * * *